(12) United States Patent
Kao

(10) Patent No.: US 7,586,565 B2
(45) Date of Patent: Sep. 8, 2009

(54) COLOR FILTER OF LIQUID CRYSTAL DISPLAY

(75) Inventor: Wei-Chih Kao, Tainan Science Based Industrial Park (TW)

(73) Assignee: Chi Mei Optoelectronics Corp., Tainan (TW)

( * ) Notice: Subject to any disclaimer, the term of this patent is extended or adjusted under 35 U.S.C. 154(b) by 530 days.

(21) Appl. No.: 11/159,176

(22) Filed: Jun. 23, 2005

(65) Prior Publication Data

US 2006/0001802 A1    Jan. 5, 2006

(30) Foreign Application Priority Data

Jun. 25, 2004    (TW)  ............... 93118598 A

(51) Int. Cl.
*G02F 1/1333*    (2006.01)
(52) U.S. Cl. ...................... 349/110; 349/106
(58) Field of Classification Search ............ 349/106, 349/110, 138
See application file for complete search history.

(56) References Cited

U.S. PATENT DOCUMENTS

| 5,617,230 | A | * | 4/1997 | Ohgawara et al. ........... 349/110 |
| 5,844,645 | A | * | 12/1998 | Kashimoto ................ 349/106 |
| 6,271,902 | B1 | | 8/2001 | Ogura et al. |
| 7,113,248 | B2 | * | 9/2006 | Chung et al. ............... 349/153 |
| 7,335,450 | B2 | * | 2/2008 | Sun et al. ...................... 430/7 |

OTHER PUBLICATIONS

China Office Action dated Jan. 16, 2009.

* cited by examiner

*Primary Examiner*—Thoi V Duong

(57) ABSTRACT

A color filter of a liquid crystal display includes a substrate, a first black matrix resin film, a second black matrix resin film and a light shield layer. The substrate has a border region surrounding an array region thereof. The first and second black matrix resin films are disposed in the border region and the array area respectively. Color photoresist patterns are formed within the array region. Every two adjacent color photoresist patterns partially overlap each other to completely cover the second black matrix resin film. The light shield layer is located at the first black matrix resin film to substantially cover the first black matrix resin film.

14 Claims, 3 Drawing Sheets

COLOR FILTER OF LIQUID CRYSTAL DISPLAY

BACKGROUND OF THE INVENTION

1. Field of Invention

The present invention relates in general to a color filter of a display, and more particularly, to a color filter of a liquid crystal display that has a black matrix (BM).

2. Related Art

The liquid crystal display panel is operative to generate color images by using three colors (red, green and blue) photoresist patterns. Currently, the main stream for fabricating the color filter includes color distribution method involved with the black matrix technique and RGB color photoresist technique. The conventional black matrix technique sputters a chromium (Cr) or a chromium oxide metal film on a glass substrate. By applying exposure, development and etching processes, the black matrix is formed, followed by the RGB color photoresist technique. The color photoresist technique uses exposure and development to a color photoresist pattern in the opening of the black matrix. Thereby, the adjacent photoresist patterns of red (R), green (G) and blue (B) are isolated by black matrix, such that the color contrast for display is improved, while the impurity of color light is avoided.

In recent year, resin has been used to replace chromium for forming black matrix due to the environment consideration. The resin is typically mixed with carbon. The applicable black matrix array does not only resolve the pollution caused by forming the metal black matrix, but also reduce reflection and promote color contrast to have better color performance. However, the resin black matrix has a relative lower optical density (OD) compared to the same thickness of metal black matrix. Therefore, the light shielding effect of the metal black matrix is much superior to that of the resin black matrix. Typically, the required optical density of a color filter has to be over 4.0, which for the chromium black matrix to achieve needs only 0.15 microns in thickness, while the resin black matrix needs more than 1.1 microns. With regard to the liquid crystal display television products that have brightness requirement, the optical density has to be over 4.5 to completely shield the light source. Such requirement of optical density ultimately increases the thickness of the resin black matrix up to 1.3 microns. When the optical density is achieved simply by increasing the thickness of the resin black matrix, the overlap between the black matrix and the color photoresist patterns protrude significantly to degrade the planarity of the substrate layers. Therefore, the thickness uniformity cannot be obtained to cause abnormal orientation of liquid crystal molecules.

SUMMARY OF THE INVENTION

The present invention is to provide a color filter of a liquid crystal display. The optical density of a border of the color filter is increased to improve the leakage of light at the border, while the over planarity of the substrate is improved to avoid abnormal orientation of the liquid crystal molecules.

According to one aspect of the present invention, the color filter of a display comprises a substrate, a first black resin film, a second black resin film and a light shield layer. The substrate includes an array region and a border region. The border region surrounds the array region. The array region includes a plurality of color photoresist patterns arranged in form of an array. The first black resin film is formed on the border region. The second black resin film is formed on the array region. The light shield layer substantially covers the first black resin film.

According to second aspect of the present invention, the color filter of a display comprises a substrate, a first black resin film, a second black resin film and a light shield layer. The substrate includes an array region and a border region. The border region surrounds the array region. The array region includes a plurality of color photoresist patterns arranged in form of an array. The first black resin film is disposed in the border region. The second black resin film is disposed in the array region and includes a plurality of openings filled with the color photoresist patterns. Two adjacent photoresist patterns are partially overlapped with each other to substantially completely cover the second black resin film. The light shield layer is located on and substantially covering the first black resin film.

According to third aspect of the present invention, the color filter of a display comprises a substrate, a first black resin film and a second black resin film. The substrate includes an array region and a border region. The array region includes a plurality of color photoresist patterns. The border region surrounds the array region. The first black resin film is disposed in the border region. The second black resin film is disposed in the array region and includes a plurality of openings filled with the color photoresist patterns. Two adjacent photoresist patterns are partially overlapped with each other to substantially completely cover the second black resin film. The first black resin film and the second black resin film are about 0.2 to about 1.1 microns in thickness.

Finally, a liquid crystal display provide by the present invention comprises a liquid crystal layer, a thin-film transistor array, a color filter substrate, a first black resin film, a second black resin film and a light shield layer. The thin-film transistor array substrate is disposed at one side of the liquid crystal layer. The color filter substrate is disposed at the opposite side of the liquid crystal layer. The color filter includes an array region and a border region surrounding the array region. The array region includes a plurality of color photoresist patterns arranged in form of an array. The first black resin film is formed on the border region. The second black resin film is formed on the array region. The light shield layer substantially covers the first black resin film.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

The color filter of the liquid crystal display as provided includes a light shield layer overlaid on the resin black matrix of a border region thereof to increase the optical density of the border region. As a result, the border region with at least two layers of resin is fabricated.

Figure 1:
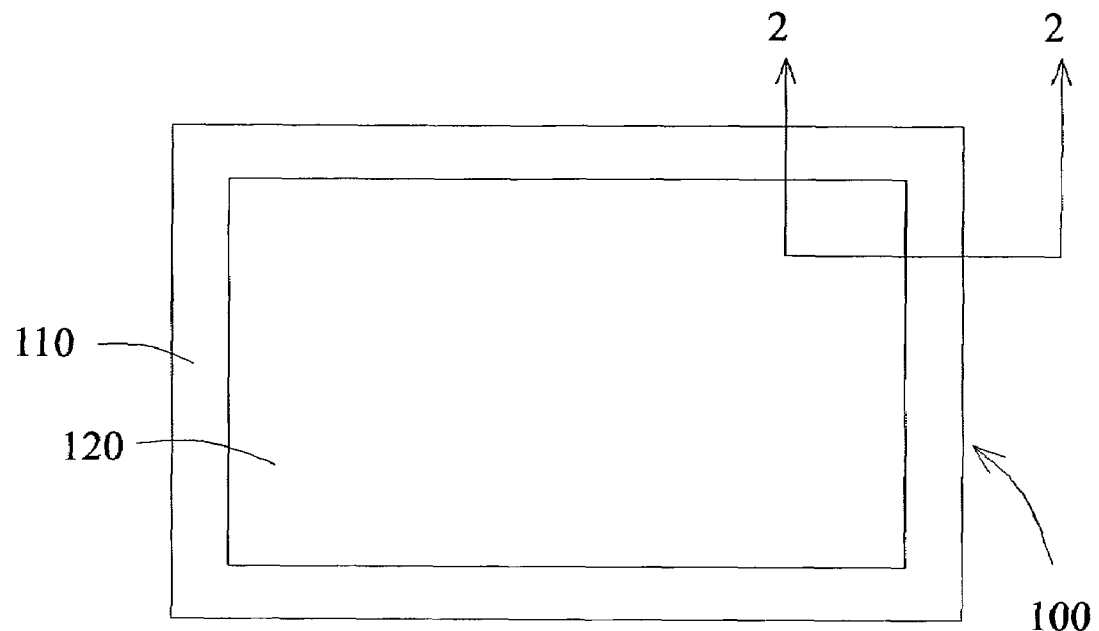
FIG. 1 shows a schematic drawing of a color filter.

Referring to FIG. 1, the substrate 100 of the color filter includes a border region 110 and an array region 120 surrounded by the border region 110.

Figure 2:
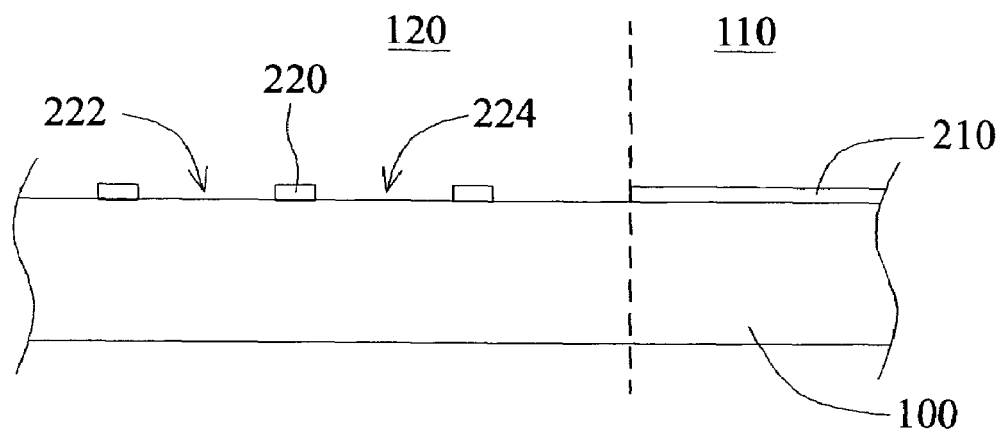
FIG. 2 shows the cross sectional view of the color filter as shown in FIG. 1 along line 2-2.

To fabricate the color filter, black matrix technique is adapted followed by RGB color photoresist technique. Referring to FIG. 2, a black matrix is formed on a substrate 100. The black matrix includes a first black resin film 210 formed on the border region 110 and a second black resin film 220 formed on the array region 120. The thickness of the first and second black resin films 210 and 220 is between 0.2 microns and 1.1 microns. In the stage of black matrix technique, the adjacent second black resin films 220 in the array region 120 include openings 222 and 224, respectively.

Figure 3:
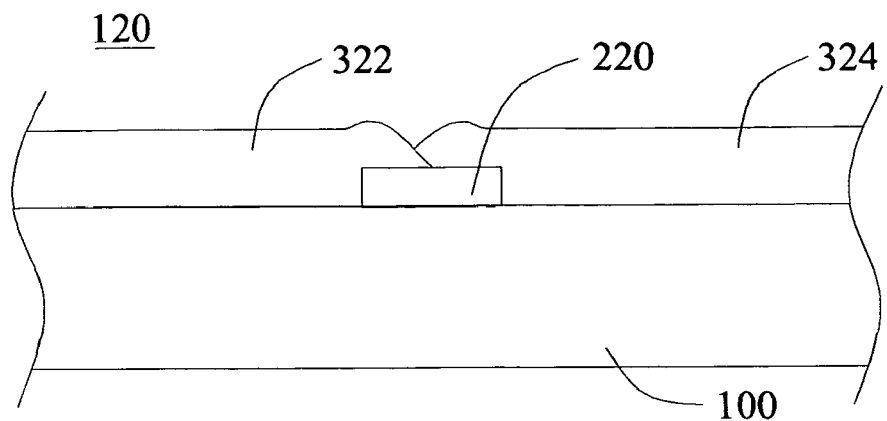
FIG. 3 shows the cross sectional view of the array of the color filter.

By the RGB color photoresist technique, RGB color photoresist patterns are formed in the openings of the array region 120. Referring to FIGS. 2 and 3, by exposure and development processes, the color photoresist patterns 322 are formed to fill the openings 222 of the array region 120 and partially cover the second black matrix film 220. The color photoresist patterns 324 are then formed to fill the opening 224 and partially cover the opening 224 of the second resin matrix film 220. Particularly, as shown in FIG. 3, the color photoresist pattern 324 on the second black resin film 220 further covers a part of the color photoresist pattern 322, so as to form an overlap portion between the first and second photoresist patterns 322 and 324. The overlap of the adjacent photoresist patterns 322 and 324 on the second black resin film 220 has a thickness preferably larger than 0.3 microns. Accordingly, every second black matrix film 220 is located between two adjacent color photoresist patterns. The adjacent color photoresist patterns 322 and 324 are also overlapping each other to cover the second black resin film 220.

Figure 4A:
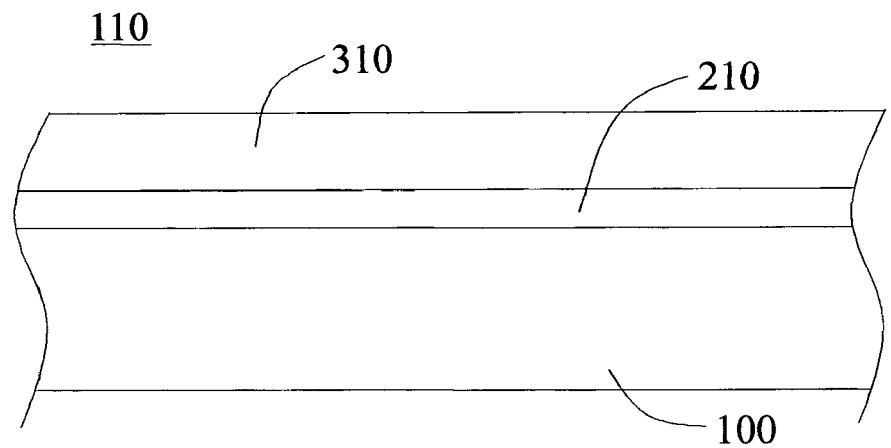
FIG. 4A shows a local cross sectional view of a first embodiment of the border region of the color filter.

Referring to FIG. 4A, the light shield layer 310 of the border region is also formed during the color photoresist process stage to cover the first black resin film 210, so as to increase the optical density of the border region 110. The light shield layer 310 has a thickness larger than 0.3 microns. The light shield layer 310 is preferably selected from a red film, a green film, a blue film or a combination thereof. The red film, blue film and green film can also be formed simultaneously with the red pattern, blue pattern and green pattern of the array region. Therefore, the light shield layer 210 is preferably formed simultaneously with the color photoresist patterns of the array region 120. The experiment shows that the optical density of the blue film is larger than that of the red film, while the red film has larger optical density compared to the green film. Therefore, the blue film is preferably selected as the light shield layer to effective increase the overall optical density of the border region. In one embodiment, a black resin film 210 with a thickness of about 0.9 microns and a blue film with a thickness of about 2 micron are selected as the light shield layer 310 to obtain an optical density of about 4.7. Thereby, the protrusion caused by the overlap of the thicker black matrix and the color photoresist patterns is avoided, while sufficient optical density of the border region can be obtained. As the light shield layer 310 is also a resin layer and the border region 110 includes the first black resin film 210 and the light shield layer 310, a frame with at least two resin films is formed in the border region 110, and the light shield layer 310 substantially covers all the first black resin film 210.

Figure 4B:
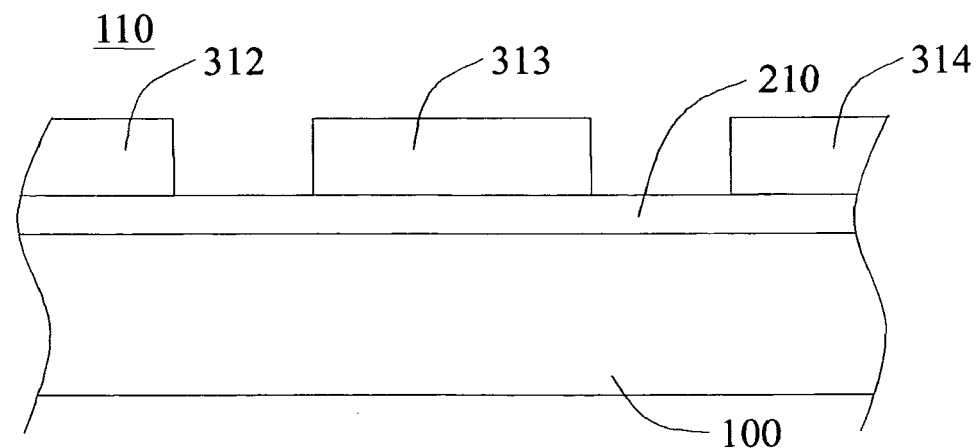
FIG. 4B shows a local cross sectional view of a second embodiment of the border region of the color filter.

Referring to FIG. 4B, the light shield of the border region is also formed in the color photoresist pattern processing stage. The first black resin film 210 covering the border region 110 increases the optical density of the border region 110. The thickness of the light shield layer 310 is preferably larger than 0.3 microns. As shown in FIG. 4B, the light shield layer is comprised of a plurality of color films, including a red film 312, a green film 313 and a blue film 314. The adjacent color films are spaced with each other by a gap, and the width of the gap is the same as the distance between the adjacent red pattern, blue pattern and green pattern. Therefore, the red film 312, the green film 313 and the blue film 314 can be formed simultaneously with the red pattern, green pattern and blue pattern, respectively. Further, only displacement is required during exposure, such that the photomask of the red pattern, green pattern and blue pattern can be used. Therefore, the light shield formed by this embodiment can achieve the same light shielding effect without extra cost. As the light shield layer is also a resin layer, and the border region includes the first black resin film 210 and the light shield layer, a frame with at least two resin films is formed, while the light shield layer 310 is substantially distributed all over the first black resin film 210.

Figure 5:
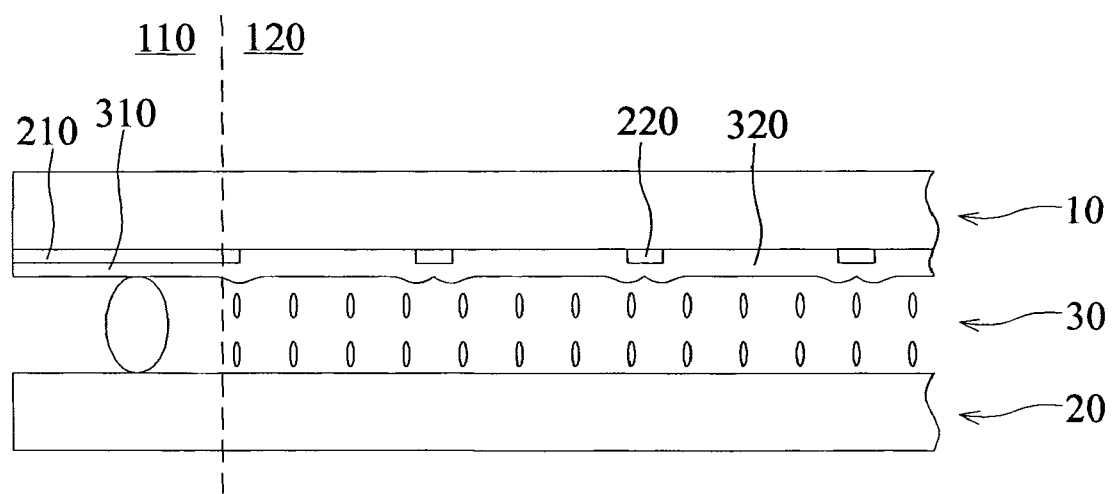
FIG. 5 schematically shows an exemplary liquid crystal display.

Referring to FIG. 5, the liquid crystal display includes a thin-film transistor array substrate 20, a liquid crystal layer 30, a color filter substrate 10, a first black resin film 210, a second black resin film 220 and a light shield layer 310. The color filter substrate 10 and the thin-film transistor array substrate 20 are arranged to face each other, while the liquid crystal layer 30 is sandwiched between the thin-film transistor array substrate 20 and the color filter substrate 10. The color filter substrate includes an array region 120 that comprises a plurality of color photoresist patterns 320 and a border region 110 surrounding the array region 120. The color photoresist patterns 320 are arranged as an array. The first black resin film 210 is disposed on the border region 110, while the second black resin film 220 is located in the array region 120. The light shield layer 310 is disposed on the first black resin film 210 to substantially cover the first black resin film 210.

In the above embodiment, the color filter of the liquid crystal display includes a light shield layer overlying the black matrix film formed on the border region, such that the optical density of the border region is increased to prevent the light leakage without increasing the thickness of the black matrix. Therefore, the light leakage is prevented without degrading the planarity of the substrate; and consequently, the abnormal orientation of the liquid crystal molecules is prevented without extra cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A color filter of a display, comprising:
a substrate comprising:
an array region including a plurality of color photoresist patterns arranged in form of an array; and
a border region surrounding said array region;
a first black resin film formed on said border region;
a second black resin film formed on said array region; and
a light shield layer located on and substantially covering all over said first black resin film.

2. The color filter of claim 1, wherein said light shield layer includes a resin layer.

3. The color filter of claim 2, wherein said light shield layer is formed simultaneously with said color photoresist patterns.

4. The color filter of claim 3, wherein said light shield layer is selected from a red film, a green film, a blue film or any combination thereof.

5. The color filter of claim 1, wherein said first black resin film and said second black resin film are about 0.2 to about 1.1 microns in thickness.

6. The color filter of claim 1, wherein said light shield has a thickness larger than 0.3 microns.

7. The color filter of claim 1, wherein said first black resin film is about 0.9 microns in thickness, and said light shield layer is a blue film of about 2 microns in thickness to obtain an optical density of said border region with about 4.7.

8. A liquid crystal display comprising:
  a liquid crystal layer;
  a thin-film transistor array substrate disposed at one side of said liquid crystal layer;
  a color filter substrate disposed at the opposite side of said liquid crystal layer, said color filter comprising:
    an array region having a plurality of color photoresist patterns arranged in form of an array; and
    a border region surrounding said array region;
  a first black resin film disposed in said border region;
  a second black resin film disposed in said array region; and
  a light shield layer disposed on said first black resin film to substantially cover all over said first black resin film.

9. The liquid crystal display of claim 8, wherein said light shield layer includes a resin layer.

10. The liquid crystal display of claim 9, wherein said light shield layer is formed simultaneously with said color photoresist patterns.

11. The liquid crystal display of claim 10, wherein said light shield layer is selected from a red film, a green film, a blue film or any combination thereof.

12. The liquid crystal display of claim 8, wherein said first black resin film and said second black resin film are about 0.2 to about 1.1 microns in thickness.

13. The liquid crystal display of claim 8, wherein said light shield has a thickness larger than 0.3 microns.

14. The liquid crystal display of claim 8, wherein said first black resin film is about 0.9 microns in thickness, and said light shield layer is a blue film of about 2 microns in thickness to obtain an optical density of said border region with about 4.7.

* * * * *